Nov. 19, 1957 C. H. L. GOODMAN 2,814,004
ELECTRICALLY SEMICONDUCTIVE OBJECT AND
METHOD OF PRODUCING SAME
Filed March 8, 1955

United States Patent Office 2,814,004

Patented Nov. 19, 1957

2,814,004

ELECTRICALLY SEMICONDUCTIVE OBJECT AND METHOD OF PRODUCING SAME

Colin H. L. Goodman, Wembley, England, assignor, by mesne assignments, to The General Electric Company, Limited, Wembley, England Application March 8, 1955, Serial No. 499,020

Claims priority, application Great Britain March 8, 1954

19 Claims. (Cl. 317—237)

Figures 1, 2:
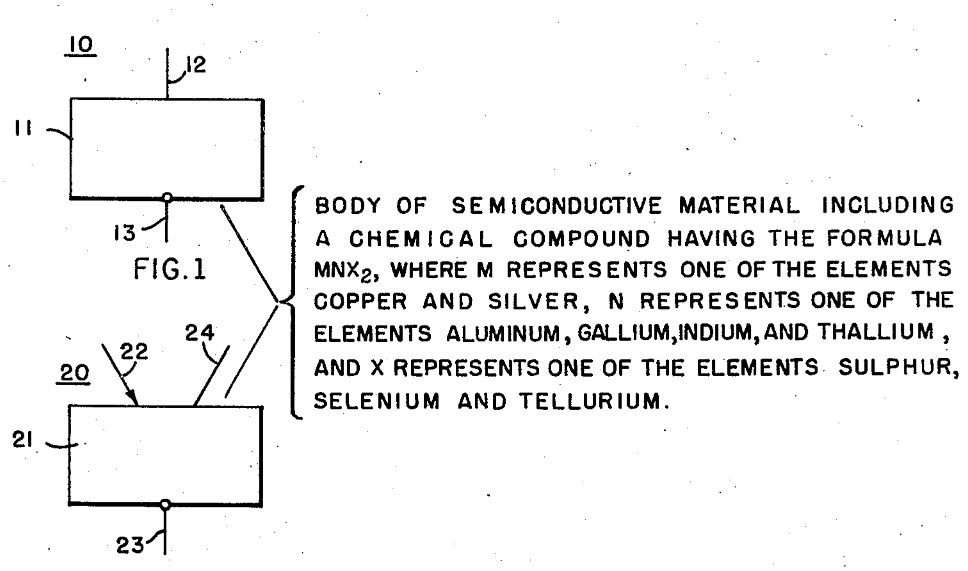

This invention relates to electrically semi-conductive objects and methods of producing those objects. Such objects have utility in various electrical devices such as in crystal diodes, triodes, tetrodes, etc., which are often referred to as transistor devices, and in photoelectric and thermoelectric devices.

It is an object of the invention to provide a new electrically semiconductive object for use in electrical signal-translating devices.

It is another object of the invention to provide for use in electrical signal-translating devices a new electrically semiconductive object which includes constituents which may be selected in relation to the value of an energy gap desired for a particular application of those devices.

It is also an object of the invention to provide a new electrical signal-translating device.

It is a further object of the invention to provide a method of producing an electrically semiconductive object.

In accordance with the invention, an electrically semiconductive object comprises a body of semiconductive material including a chemical compound having the formula $MNX_2$, where M represents one of the elements copper and silver, N represents one of the elements aluminium, gallium, indium, and thallium, and X represents one of the elements sulphur, selenium, and tellurium.

Also in accordance with the invention, a method of producing an electrically semiconductive object comprises melting together in an inert atmosphere quantities of at least one of a first group of elements copper and silver, at least one of a second group of elements aluminium, gallium, indium, and thallium, and at least one of a third group of elements sulphur, selenium, and tellurium in atomic proportions determined by the formula $MNX_2$, where M represents an element of said first group, N an element of said second group, and X an element of said third group, and cooling the melt to form said object upon solidification.

Further in accordance with the invention, an electrical signal-translating device comprises a body of semiconductive material including a chemical compound having the formula $MNX_2$, where M represents one of the elements copper and silver, N represents one of the elements aluminium, gallium, indium, and thallium, and X represents one of the elements sulphur, selenium, and tellurium. The device also includes means for establishing spaced electrical connections to the aforesaid body.

For a better understanding of the present invention, together with other and further objects thereof, reference is had to the following description taken in connection with the accompanying drawing, and its scope will be pointed out in the appended claims.

Referring to the drawing:

Fig. 1 is a representation of a crystal diode employing a body of semiconductive material in accordance with the invention, and Fig. 2 is a representation of a transistor device employing such a semiconductive body.

According to the invention, the crystal diode 10 of Fig. 1 is an electrical semiconductive object comprising a body 11 of semiconductive material including a chemical compound having the formula $MNX_2$, where M represents one of the elements copper and silver, N represents one of the elements aluminium, gallium, indium, and thallium, and X represents one of the elements sulphur, selenium, and tellurium. Expressed somewhat differently, the semiconductive object or semiconductor is a compound having the formula $MNX_2$, where M represents copper or silver, N represents aluminium, gallium, indium, or thallium, and X represents sulphur, selenium, or tellurium.

The ternary compounds of this group have a crystal structure approximating the chalcopyrite ($CuFeS_2$) structure, which is an analogue of the diamond srtucture possessed by the widely used semi-conductors germanium and silicon.

The fundamental properties of the materials, for example, the values of the energy gap between the normally filled and conduction electron energy bands and the mobilities of the charged carriers (conduction electrons and "holes") will differ for different compounds in the group, so that it is possible to choose appropriate compounds for different applications according to the particular properties required. For example, the value of the energy gap, that is, the minimum energy required to release a hole electron pair, will decrease as the constituent N is varied along the series aluminium, gallium, indium, thallium, and also as the constituent X is varied along the series sulphur, selenium, tellurium.

The crystal diode 10 of Fig. 1 also includes means for establishing spaced electrical connections to the body 11. This means may comprise the pair of conductive connections 12 and 13 which make rectifying contact with the body. Connection 13 ordinarily makes ohmic contact with body 11.

The transistor device 20 of Fig. 2 is similar in construction to the crystal diode 10 of Fig. 1 and includes a body of semiconductive material 21 having the usual emitter and connector connections 22 and 24 and a base connection 23.

The compound $CuInTe_2$ is representative of the materials under consideration employed in the devices and may be prepared by melting together the constituent elements in appropriate atomic proportions in an inert atmosphere such as an evacuated silica container at a temperature of about 1100° C. and then cooling the melt to solidify it. The resultant material was similar in appearance and mechanical properties to germanium and was found to have a high thermoelectric power and to exhibit rectifying action in conjunction with a suitable metal contact. The compound $CuInSe_2$ may also be prepared in a similar manner and has been found to show good rectifying properties in conjunction with a metal contact.

Other compounds which have been produced in a similar manner are $CuAlTe_2$, $AgInTe_2$, and $AgInSe_2$. The temperature at which the elements are heated will vary with the materials used since it is necessary to heat the constituents to a temperature above the melting point of the compound. The specimens produced by the described method were polycrystalline. When such crystals are sufficiently large, no cracks due to differential expansion of the materials in different crystallographic directions result. Conversely, if the polycrystalline specimens are very small, no cracks occur.

The body of semiconductive material may also be prepared by employing zone-melting techniques such as disclosed in applicant's abandoned application Serial No. 479,569, filed January 3, 1955, and entitled "Method of Producing Electrically Semiconductive Objects." In applying this method, the ingot which is produced is maintained in the furnace at a temperature slightly below the melting point of the material in order to prevent the condensation on colder parts of the apparatus of a volatile constituent of the material distilled from the molten zone. For example, in the production of copper indium selenide by this method, the ingot was maintained in the furnace at a temperature somewhat below the melting point, 995° C.

The values of the energy gap for copper indium selenide, silver indium telluride, and silver indium selenide observed by the measurement of the transmission of infrared radiation through thin specimens of those materials were, respectively, 0.9 electron volt, 0.9 electron volt, and 1.2 electron volts. It has been determined that for corresponding compounds of the type under consideration, the energy gap is larger in the case where silver is employed as one of the elements of the compound rather than copper.

Bodies of semiconductive materials having values of energy gaps within a range of 0.5–1.5 electron volts appear to be useful as transistors and rectifiers and would include compounds of the type mentioned above such as indium selenides, indium tellurides, gallium tellurides, and thallium sulphides. Bodies of semiconductive materials having energy gaps within a range of 1.5–2.5 electron volts (e. g. the indium sulphides, gallium selenides, and aluminium tellurides of the group referred to) appear to be useful as photoconductors while those having energy gaps greater than 2.5 electron volts (e. g. the gallium and aluminium sulphides, and aluminium selenides of the group referred to) are believed to exhibit electroluminescence.

Bodies of semiconductive material including solid solutions having at least two of the chemical compounds having the formula $MNX_2$, where those symbols represent the elements recited above, also appear to be useful in electrical signal-translating devices of the type under consideration.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrically semiconductive object comprising: a body of semiconductive material including a chemical compound having the formula $MNX_2$, where M represents one of the elements copper and silver, N represents one of the elements aluminium, gallium, indium, and thallium, and X represents one of the elements sulphur, selenium, and tellurium.

2. An electrically semiconductive object comprising: a body of semiconductive material having a crystalline structure approximating that of $CuFeS_2$ and including a chemical compound having the formula $MNX_2$, where M represents one of the elements copper and silver, N represents one of the elements aluminium, gallium, indium, and thallium, and X represents one of the elements sulphur, selenium, and tellurium.

3. An electrically semiconductive object comprising: a body of semiconductive material including a chemical compound having the formula $MNX_2$, where M represents one of the elements copper and silver, N represents one of the elements aluminium, gallium, indium, and thallium, and X represents one of the elements sulphur, selenium, and tellurium; said material having a different value of energy gap depending upon which one of said elements aluminium, gallium, indium, and thallium the constituent N represents, and which one of said elements sulphur, selenium, and tellurium the constituent X represents.

4. An electrically semiconductive object comprising: a body of semiconductive material including a chemical compound having the formula $MNX_2$, where M represents one of the elements copper and silver, N represents one of the elements aluminium, gallium, indium, and thallium, and X represents one of the elements sulphur, selenium, and tellurium; said material having a value of energy gap which decreases when the constituent N represents one of said elements aluminium, gallium, indium, and thallium in the order recited, and when the constituent X represents one of said elements sulphur, selenium, and tellurium in the order recited.

5. An electrically semiconductive object comprising: a body of semiconductive material including a chemical compound having the formula $CuInTe_2$ and having a crystalline structure approximating that of $CuFeS_2$.

6. An electrically semiconductive object comprising: a body of semiconductive material including a chemical compound having the formula $CuInSe_2$ and having a crystalline structure approximating that of $CuFeS_2$.

7. A method of producing an electrically semiconductive object comprising: melting together in an inert atmosphere quantities of at least one of a first group of elements copper and silver, at least one of a second group of elements aluminium, gallium, indium, and thallium, and at least one of a third group of elements sulphur, selenium, and tellurium in atomic proportions determined by the formula $MNX_2$, where M represents an element of said first group, N an element of said second group, and X an element of said third group, and cooling the melt to form said object upon solidification.

8. A method of producing an electrically semiconductive object comprising: melting together in an inert atmosphere quantities of the elements copper, indium, and tellurium in atomic proportions determined by the formula $CuInTe_2$, and cooling the melt to form said object upon solidification.

9. A method of producing an electrically semiconductive object comprising: melting together in an inert atmosphere at a temperature of about 1100° C. quantities of the elements copper, indium, and tellurium in atomic proportions determined by the formula $CuInTe_2$, and cooling the melt to form said object upon solidification.

10. An electrical signal-translating device comprising: a body of semiconductive material including a chemical compound having the formula $MNX_2$, where M represents one of the elements copper and silver, N represents one of the elements aluminium, gallium, indium, and thallium, and X represents one of the elements sulphur, selenium, and tellurium; and means for establishing spaced electrical connections to said body.

11. An electrical signal-translating device comprising: a body of semi-conductive material including a chemical compound having the formula $MNX_2$, where M represents one of the elements copper and silver, N represents one of the elements aluminium, gallium, indium, and thallium, and X represents one of the elements sulphur, selenium, and tellurium; and at least a pair of spaced electrical connections connected to said body.

12. An electrical signal-translating device comprising: a a body of semiconductive material having the chemical formula $CuInSe_2$ and having a crystalline structure approximating that of $CuFeS_2$; and spaced electrical connections connected to said body.

13. An electrical signal-translating device comprising: a body of semiconductive material having the chemical formula $CuInTe_2$ and having a crystalline structure approximating that of $CuFeS_2$; and spaced electrical connections connected to said body.

14. A transistor comprising: a body of semiconductive material including a chemical compound having the formula $MNX_2$, where M represents one of the elements copper and silver, N represents one of the elements gallium, indium, and thallium, and X represents one of the elements sulphur, selenium, and tellurium; and means for establishing spaced electrical connections to said body.

15. A transistor comprising: a body of semiconductive material including a chemical compound having the formula $MNX_2$, where M represents one of the elements copper and silver, N represents the element indium, and X represents one of the elements selenium and tellurium; and means for establishing spaced electrical connections to said body.

16. A transistor comprising: a body of semiconductive material including a chemical compound having the formula $MNX_2$, where M represents one of the elements copper and silver, N represents gallium, and X represents tellurium; and means for establishing spaced electrical connections to said body.

17. A transistor comprising: a body of semiconductive material including a chemical compound having the formula $MNX_2$, where M represents one of the elements copper and silver, N represents thallium, and X represents sulphur; and means for establishing spaced electrical connections to said body.

18. An electrically semiconductive object comprising: a body of semiconductive material including a solid solution having at least two of the chemical compounds having the formula $MNX_2$, where M represents one of the elements copper and silver, N represents at least one of the elements aluminium, gallium, indium, and thallium, and X represents at least one of the elements sulphur, selenium, and tellurium.

19. An electrically semiconductive object comprising: a body of semiconductive material including a solid solution having two of the chemical compounds having the formula $MNX_2$, where M represents one of the elements copper and silver, N represents at least one of the elements aluminium, gallium, indium, and thallium, and X represents at least one of the elements sulphur, selenium, and tellurium.

References Cited in the file of this patent

UNITED STATES PATENTS

| | | |
|---|---|---|
| 2,247,754 | Hensel et al. | July 1, 1941 |
| 2,502,479 | Pearson et al. | Apr. 4, 1950 |
| 2,524,035 | Bardeen et al. | Oct. 3, 1950 |